L. W. POND.
Rafting-Boom.

No. 203,558. Patented May 14, 1878.

Witnesses:
H. F. Bruns.
O. W. Bond.

Inventor:
Levi W. Pond.
By West & Bond,
Attys.

UNITED STATES PATENT OFFICE.

LEVI W. POND, OF EAU CLAIRE, WISCONSIN.

IMPROVEMENT IN RAFTING-BOOMS.

Specification forming part of Letters Patent No. 203,558, dated May 14, 1878; application filed March 4, 1878.

*To all whom it may concern:*

Be it known that I, LEVI W. POND, of Eau Claire, Eau Claire county, State of Wisconsin, have invented a new and useful Improvement in Booms, of which the following is a full description, reference being had to the accompanying drawings, in which—

Figure 1:
Figure 3:
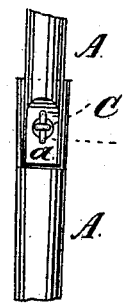
Figure 2:
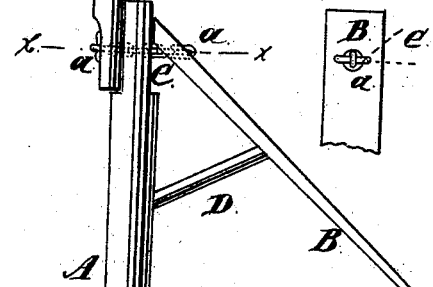
Figure 4:
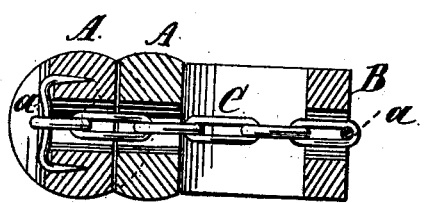

Figure 1 is a top or plan view; Fig. 2, a detail, showing the wing-connection with the chain; Fig. 3, a detail, showing the end of the log or section and the chain-connection; Fig. 4, a section enlarged on line $x\ x$ of Fig. 1.

The principal object of this invention is to so construct a boom that the connection for the sections will also serve the purpose of a hinge for attaching the wings, thereby dispensing with the use of a separate hinge for this purpose; and its nature consists in locating a wing at the point of each section, and connecting the sections together, and attaching the wings thereto by means of a chain passing through the ends of the sections and the wings, and held in place by any suitable means; and in providing a brace for setting the wings in position to throw the boom across the current at any desired angle.

In the drawings, A represents two sections of a boom; B, the wing; C, the connecting-chain; D, the brace; $a$, the toggles or fastening-pins.

The sections A in the form of boom shown are formed from round logs, two of the sides at the end of each log being squared or cut away for the purpose of enabling the proper connection to be made between the sections or logs, and to allow the wings to be attached.

The wings B may be made in the form shown, or of any form suitable for the purpose of operating the boom, the end which comes in contact with the boom section or log being formed angling for the purpose of giving an incline to the wings when in place. As many sections as may be required for the length of boom are to be employed, and a wing is to be attached at the joint of each section.

The sections or logs are joined or connected together and the wings attached thereto by a chain, C, a chain being used at each joint. These chains C may be of any suitable construction, having strength sufficient to prevent their easy breaking. Each chain C passes through suitable openings provided for it in the ends of the logs or sections and the wing, as shown in Fig. 4, and its ends are secured by means of toggles $a$ or irons provided with sharp points at their ends, the end links of the chain being passed over the toggle $a$, and the toggles then secured by driving the points into the wood.

The length of the chains C depends upon the thickness of the logs or sections and the wing and its location, and the length must be such as to hold the wing against the log or section, and yet permit of a little end play of the logs or sections.

The brace D is to be of any desired length, the length depending on the position which it is desired the wing shall be inclined to throw the boom across the current at any desired angle.

Other devices than the toggles $a$ can be used for securing the ends of the chain to the logs or sections and the wings; but such toggles are easily applied and form an efficient and strong fastening.

By this construction the chain C forms a means for connecting the sections together, and also forms a hinge for the wing, which hinge will securely hold the wing in place under all circumstances; and in case of great strain on the sections such strain will act to draw the wing closer to the section, thereby making the joint stronger, and at the same time the chain is sufficiently slack that in case the boom is struck by an object it will allow the joint to yield, so as to prevent the boom from being broken at the joint.

By this arrangement a connection and hinge is formed which will be perfectly free and adjustable, and yet strong and durable, and one which is very simple and cheap, and by the use of which booms can be constructed from logs in the woods, where it is sometimes desirable to have a boom the expense of constructing which will not be very much, and which will not require any great amount of skill in putting together or taking apart.

As shown, the sections A are composed of round logs; but the construction of the connection and joint can be used with other forms of sections when a cheap, simple, and efficient boom is required.

The openings in the ends of the section should be large enough to permit the easy passage of the chain and to prevent binding.

When the wings are located at the joints, as described, the tendency is to strengthen the joints.

What I claim as new, and desire to secure by Letters Patent, is—

1. The chain C, in combination with the logs or sections A and wings B, for connecting the sections together and forming a hinge for the wings, substantially as specified.

2. A boom consisting of the logs or sections A, wings B, chain C, and brace D, all constructed and arranged substantially as and for the purposes specified.

LEVI W. POND.

Witnesses:
 WM. FRANKLIN SEAVEY,
 JOHN R. MASON.